United States Patent
Wheadon et al.

[15] 3,679,789
[45] July 25, 1972

[54] PROCESS OF MAKING A BATTERY PLATE GRID

[72] Inventors: Ellis G. Wheadon, Yorktown; Norman L. Willmann, Anderson, both of Ind.

[73] Assignee: General Motors Corporation, Detroit, Mich.

[22] Filed: May 18, 1970

[21] Appl. No.: 38,441

Related U.S. Application Data

[62] Division of Ser. No. 780,068, Nov. 29, 1968, Pat. No. 3,556,854.

[52] U.S. Cl. ............................................................264/249
[51] Int. Cl. ..................................H01j 35/04, H01m 35/00
[58] Field of Search ..................................264/249, 248-252, 264/271-274, 294, 331; 136/54, 55, 58, 63, 59, 143, 36, 46, 37, 70, 75, 76, 175, 176

[56] References Cited

UNITED STATES PATENTS

| 1,008,029 | 11/1911 | Gorman | 264/249 X |
| 3,491,183 | 1/1970 | Brow | 264/249 |
| 3,595,700 | 7/1971 | Rosansky | 264/249 |

FOREIGN PATENTS OR APPLICATIONS

| 691,712 | 5/1953 | Great Britain | 136/58 |
| 1,935,803 | 3/1970 | Germany | 136/36 |

Primary Examiner—Robert F. White
Assistant Examiner—Willard E. Hoag
Attorney—William S. Pettigrew, R. J. Wallace and Lawrence B. Plant

[57] ABSTRACT

A process for making a battery plate grid, the grid being formed from a fan-like conductor and a grate-like nonconductor bonded one to the other by a plurality of fusion-interlocked joints.

2 Claims, 7 Drawing Figures

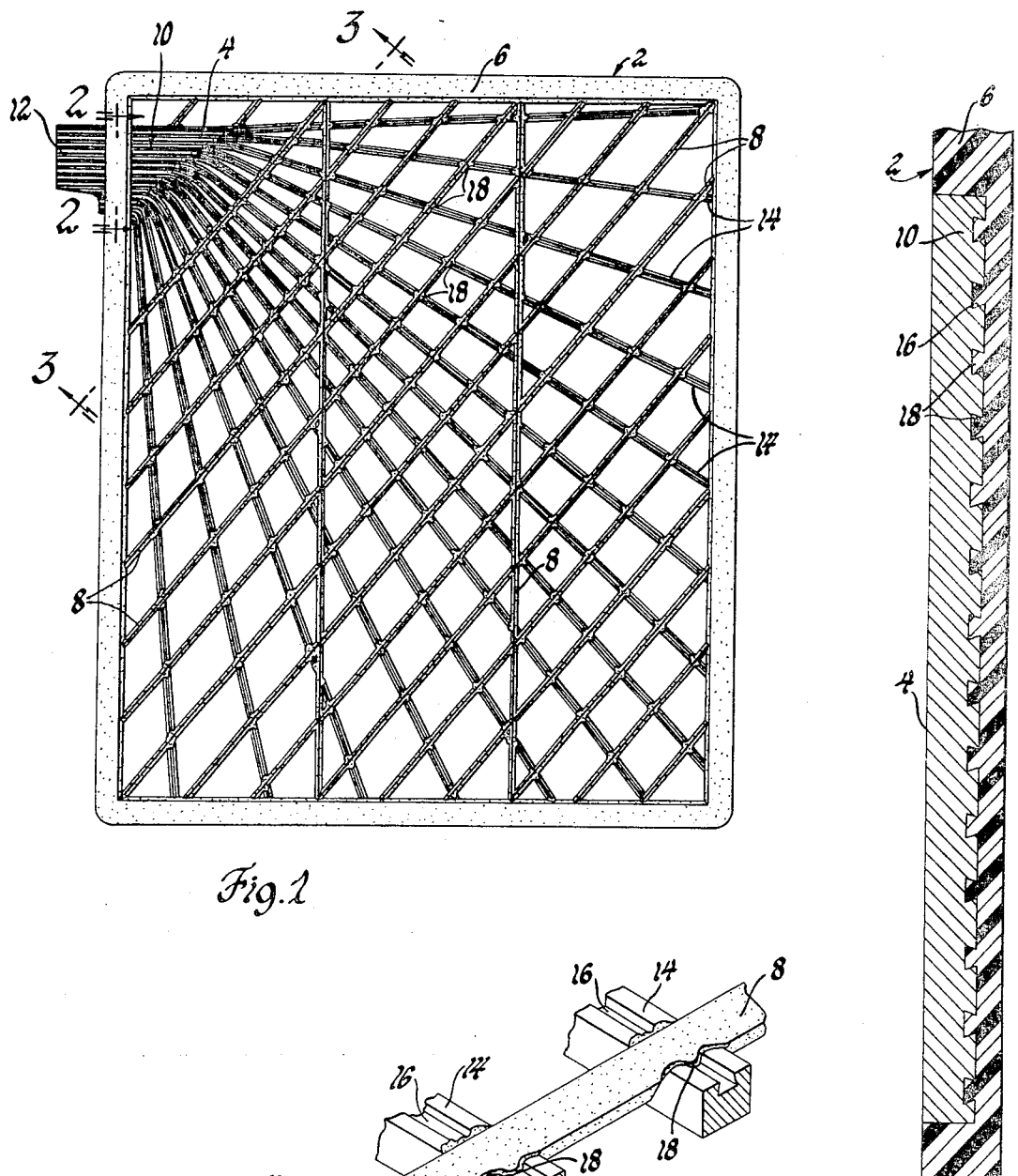
Fig. 1
Fig. 2
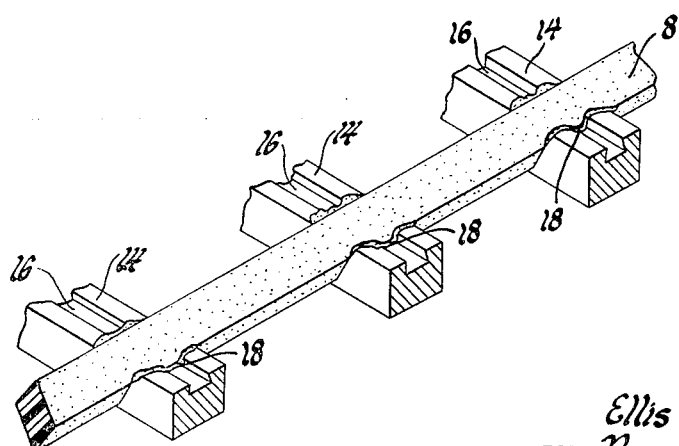
Fig. 3
INVENTORS.
Ellis G. Wheadon, &
BY Norman L. Willmann
Lawrence B. Plant
ATTORNEY

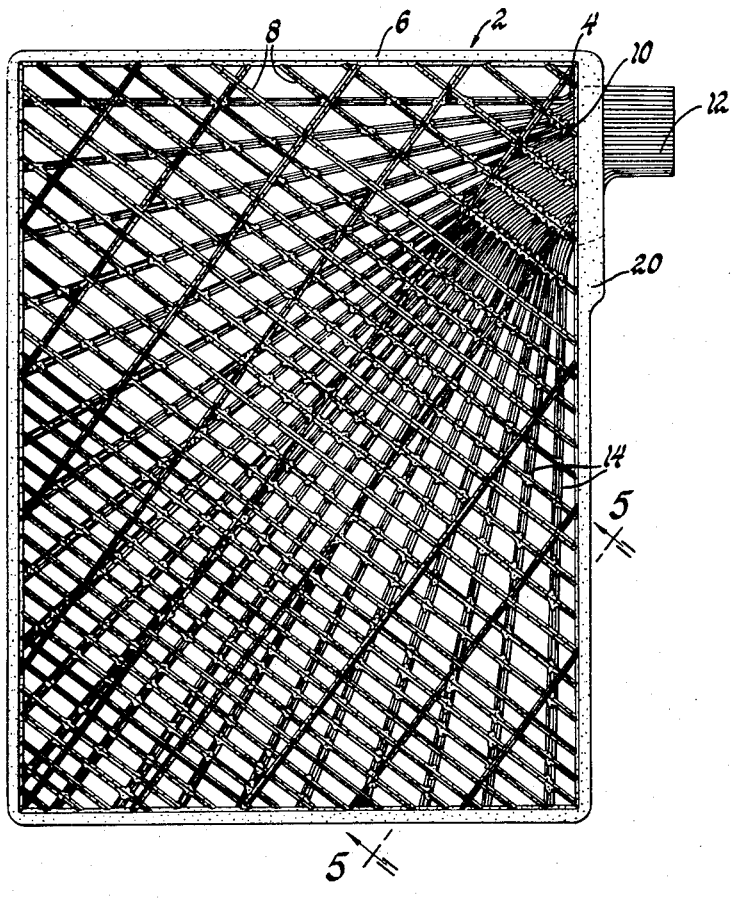
Fig 4
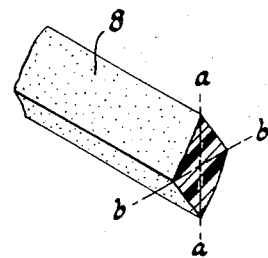
Fig.5
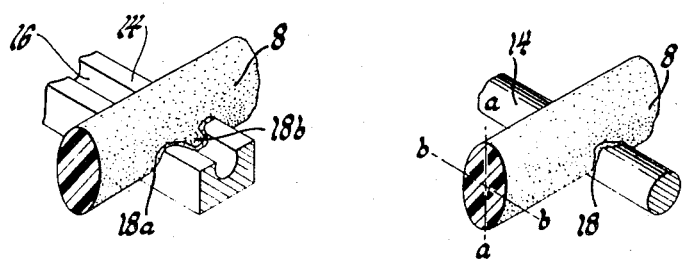
Fig.6
Fig.7
INVENTORS.
Ellis G. Wheadon, &
BY Norman L. Willmann
Lawrence B. Plaut
ATTORNEY

PROCESS OF MAKING A BATTERY PLATE GRID

This application is a division of application Ser. No. 780,068 entitled "BATTERY PLATE GRID", filed Nov. 29, 1968 in the names of Ellis G. Wheadon and Norman L. Willmann, and assigned to the assignee of this application.

Application Ser. No. 780,068 is now U.S. Pat. No. 3,556,854, issued Jan. 19, 1971.

In recent years, there has been a trend toward producing lighter batteries. A convenient way to do this is by reducing the weight of such elements as the case, top, grids, connectors, etc. Lightweight grids of plastic or the like are therefore becoming more commercially important. With the advent of plastic grids has come the requirement for developing techniques for attaching conductive elements to the comparatively fragile plastic supports in a manner such that they will not come loose during subsequent handling and service. This invention relates to an improved lightweight composite battery plate grid and a technique for forming same.

It is an object of this invention to provide a light-weight, lead-conserving battery plate grid which is a composite of a multi-fingered conductor and a finger-spacing, nonconductive, fusible carrier joined at a plurality of fusion-interlocked joints.

This invention comprehends battery plate grids which are composites of multi-fingered, fanned-out conductors and carriers therefor which are joined together at a plurality of fusion interlocked joints. The carriers may comprise simply a series of parallel strips which intersect and space the fingers one from the other. In a preferred form, fusion-interlocking is accomplished by superposing a fanned conductor atop a fusible, plastic nonconductor (e.g., a perforated sheet). The conductor has a plurality of electrically conductive fingers diverging from a common juncture. A heated plate is caused to rest upon the conductor. When the conductor gets hot enough, the plastic in contact with the conductor fuses (softens) and at the same time pressure is applied by the plate to press the conductor into the nonconductor. In its most preferred form, the nonconductor is a grate-like sheet having a border and a plurality of oblong shaped grid wires intersecting the border and the conducting fingers have locking grooves therein into which the fused nonconductor flows and hardens to form an introfused, interlocked joint. The fusible nonconductor also flows around the fingers and upon hardening forms a circumfused, interlocked joint.

FIG. 1 is an elevational view of a composite battery grid in accordance with this invention.

FIG. 2 is a partially sectioned view taken along the lines 2—2 of the grid shown in FIG. 1.

FIG. 3 is a partially sectioned perspective view taken along the line 3—3 of the battery grid shown in FIG. 1.

FIG. 4 is an elevational view of another grid formed in accordance with this invention.

FIG. 5 is a partially sectioned perspective view of a grid wire taken along the lines 5—5 of FIG. 4.

FIGS. 6 and 7 depict other embodiments of applicant's invention.

FIG. 1 shows a composite battery plate grid which is comprised principally of a perforated plate 2 and a fanned-out conductor 4. In its preferred form the nonconductive perforated plate 2 comprises a border 6 and a number of grid wires 8. The grid wires 8 extend across the face of the plate 2 and intersect the borders 6 so as to form a generally grate-like structure. For purposes of this invention, it is preferred that a major portion of the grid wires 8 extend diagonally across the perforated plate 2 rather than parallel to the borders. The conductor 4 comprises a juncture 10 and a plurality of fingers 14 which diverge from the juncture 10 in a fan-like manner so as to extend across the face of the perforated plate 2. In its most convenient form, the conductor 4 initially comprises a ribbon of metal (i.e., lead) which has been slit a number of times to provide the fingers 14. Prior to joining the conductor with the nonconductor, the fingers 14 are flared outwardly from the juncture 10. The use of the word juncture herein is merely intended to refer to that portion of the conductor where the several fingers meet to form a single conductor, i.e., an electrical confluence. It is not intended that the word juncture be limited to a one-piece conductor but may, of course, include a braided or equivalent conductor formed by the several fingers 14. A plate lug 12 is provided as a means for withdrawing the current from the plate and is most conveniently a continuation of the conductor, e.g., extended juncture. Locking grooves 16 are provided in the fingers 14 and preferably the juncture 10. The locking grooves 16 are undercut, e.g. as dovetails or the like, as best shown in FIGS. 2, 3 and 6. The perforated plate 2 is comprised of a material which is fusible at a temperature below that of the conductive. It is herein intended that the word "fusible" be used in the more general sense of being susceptible to reduction to at least the plastic state by heat. The nonconductor is preferably polypropylene but other polymer plastics may also conveniently be used. As will be discussed in more detail hereinafter in connection with the process for fabricating the composite grid, a plurality of fusion interlocked joints 18 are formed. In FIGS. 1, 2 and 3 the fusion interlocked joints 18 depicted are of the introfused type wherein the fusible nonconductor flows into a cavity or locking groove in the conductor 4. In FIGS. 6 and 7, the fusion interlocked joint depicted is of the circumfused type wherein the fusible nonconductor flows around the conductor to form the joint.

FIG. 2 is an exploded view of the nature of the fusion-interlocked joint provided at the locus of intersection of the juncture 10 and the border 6. A number of locking grooves 16 are provided in the juncture 10 as were provided in the several fingers 14. As a result, at the time of bonding a plurality of fusion-interlocked joints are provided between the juncture and the border. These joints 18 are of the introfused type.

FIG. 3 depicts a partially sectioned exploded perspective view of a portion of the grid shown in FIG. 1 and more clearly depicts the nature of the several fusion-interlocked joints 18 formed between the several grid wires 8 and fingers 14. In this embodiment the locking grooves 16 are of the dovetail type.

FIG. 4 depicts another embodiment of the invention but differs from that disclosed in FIG. 1, primarily with respect to the number and arrangement of the grid wires 8. In the FIG. 4 embodiment considerably more grid wires are provided in the one direction and a number of additional grid wires are provided in another direction normal to the direction of the first grid wires. This arrangement generally provides for a somewhat stronger grid. It is also noted that the border 6 has, for the must part, a smaller dimension than that shown in FIG. 1 and as a result the need for the additional grid wires 8 becomes more apparent. A widened portion 20 of the border 6 may be provided to insure a good fusion-interlock between the juncture 4 and the border 6. Another distinction between the embodiments shown in FIGS. 1 and 4 is that the locking grooves 16 formed in the conductor 4 have been formed diagonally into a much larger lead ribbon and a conductor having an appropriately shaped juncture and lug 12 stamped therefrom prior to the flaring and setting of the fingers 8.

FIG. 5 depicts another aspect of this invention and shows in exploded, sectioned, perspective view a grid wire 8. In section the grid wire 8 is oblong having a major axis $a—a$ and a minor axis $b—b$. In this particular embodiment the grid wire 8 is generally rectangular in shape. Other oblong shaped grid wires, such as ellipses or the like, may conveniently be used as shown in FIGS. 6 and 7. In forming the composite grids of this invention, it is preferred that the grid wires 8 be oriented such that the major axis $a—a$ is normal to the fingers 14 (See FIG. 6). The advantages of this arrangement will be more clearly discussed hereinafter.

FIGS. 6 and 7 depict other embodiments of applicants's invention. FIG. 6 discloses the use of a grid wire 8 having generally an elliptical cross section and in which two fusion interlocks are formed simultaneously, the first being of the circumfusion type 18a and the second being of the introfusion type 18b. FIG. 7 shows an elliptically shaped grid wire 8 in circumfused relation to a rounded conductive finger 14.

Although not shown on the drawings, it is most convenient to also form fusion-interlocked joints between the ends of the several fingers 14 and the grid border 6.

In preparing the composite grid, the nonconductive perforated plate is formed to the desired configuration. It may be molded or punched. The perforated sheet may be comprised simply of a sheet of plastic having a plurality of holes punched therein or as in the preferred form, it is comprised of a border and a plurality of grid wires intersecting one another and the grid border to form a grate-like structure. By the word "grate-like" I intend to include structures which are similar to grates and comprise a frame of parallel bars or a lattice of crossbars. It is preferable that the bars, which are herein referred to as the "grid wires", be oblong such that they have both a major and minor axis with the minor axis being substantially parallel to the principal plane of the grid and the major axis being substantially normal to the principal plane of the grid. By having the major axis substantially normal to the principal plane of the grid and therefore substantially normal to the conductor, distinct benefits are obtainable. During the fusion-interlocking step, which will be described hereafter, the conductive fingers sink deeply into the grid wires in the direction of the major axis with less chance of melting completely through the wires.

In the process for making the composite grid, the conductor 4 is formed from a strip of lead which has a number of locking grooves formed in one surface thereof. The strip is cut between the grooves to form the plurality of fingers. An end portion of the strip is left unslit and forms the juncture of the many fingers, as well as the lug for the plate. The fingers are fanned out from the juncture and diverge in as many directions as is necessary to adequately provide good electrical conductivity through the plate. The thus fanned conductor is placed atop the nonconductive, grate-like fusible support with the grooved side contacting the plastic. A heated plate is placed on the conductor and transfers its heat to the conductor. After the conductor is thusly heated, pressure is applied to the plate which causes the heated wires to sink into the fusible nonconductor. The nonconductor fuses only at the points of intersection of the heated conductor and the nonconductor. The fused portions of the nonconductor flow into the locking grooves and around the wires. Upon cooling, a tight, fusion-interlocked weld or welds result at each of the fusion points. By fusion-interlock between two members, as used herein, is meant merely an interlocking joint resulting from the fusion and flow of one of the members into or about the other member such that a mechanical bond between the two is formed whether it be of a circumfused or introfused type or both. By an introfused joint is meant one which has been formed by the flow of the fused material into an anchoring cavity or the like in the other member. By a circumfused joint is meant one which is formed by the flow of the fusible material around the other member.

In one specific example of the invention, a nonconductive grate-like support, such as shown in FIG. 1, is comprised of talc-filled polypropylene wherein the talc may vary from about 20 percent to about 40 percent. The 20 percent talc-filled polypropylene has a softening point of about 240° F., whereas the 40 percent talc-filled polypropylene has a softening point of about 270° F. The conductor comprises a lead alloy containing a small proportion of calcium. The grate-like nonconductor is about 0.060 inch thick along the major axis of the grid wire. The conductor is about 0.040 inch thick. The conductor is laid atop the plastic and preheated with a metal plate which is at a temperature of about 450° F. This preheating lasts about ½ second. Subsequently about 200 lbs/inch$^2$ of pressure is applied to the plate to press the conductor into the plastic. Mechanical stops are provided to insure that the conductor does not cut through the grid wire.

While the invention has been disclosed solely in terms of certain specific embodiments thereof, its scope is only limited to the extent hereinafter defined.

We claim:

1. A process for manufacturing thin, light-weight, lead-acid storage battery grids comprising the steps of:
   forming, in a first plane, fan-like array of lead-rich electrically conducting fingers diverging from a common junction each of said fingers having anchoring cavities therein;
   forming, in a second plane, finger-spacing carrier me for said array, said means comprising a light-weight, substantially nonconducting, fusible material having a softening point lower than said fingers;
   juxtaposing said array and said carrier means such that said planes substantially parallel each other;
   heating said array sufficiently to cause softening of said fusible carrier at the loci of intersection of said array and said carrier;
   pressing said array and said carrier together to imbed said array in said carrier at said loci and thereby merge them into an approximately coplanar composite grid and to cause said fusible material to flow into said anchoring cavities and at least partially around said fingers; and
   cooling said composite to affix said array to said carrier by a plurality of fusion-interlock joints extending throughout the principal plane of said grid.

2. The process of claim 1 wherein said anchoring cavities are locking grooves extending longitudinally along said fingers.

* * * * *